(12) United States Patent
Lindsay

(10) Patent No.: US 7,543,784 B2
(45) Date of Patent: Jun. 9, 2009

(54) CLAMPS FOR ELONGATE MEMBERS

(75) Inventor: Richard Arthur Lindsay, Suffolk (GB)

(73) Assignee: Vitec Group PLC, Suffolk (GB)

( * ) Notice: Subject to any disclaimer, the term of this patent is extended or adjusted under 35 U.S.C. 154(b) by 0 days.

(21) Appl. No.: 10/362,955

(22) PCT Filed: Sep. 6, 2001

(86) PCT No.: PCT/GB01/04008

§ 371 (c)(1),
(2), (4) Date: Feb. 25, 2003

(87) PCT Pub. No.: WO02/21000

PCT Pub. Date: Mar. 14, 2002

(65) Prior Publication Data

US 2003/0189145 A1   Oct. 9, 2003

(51) Int. Cl.
*F16M 11/38* (2006.01)

(52) U.S. Cl. ............... 248/168; 248/228.2; 248/231.85

(58) Field of Classification Search ............... 248/431, 248/166, 168, 169, 434, 222.13, 230.2, 231, 248/31, 226.11, 231.85, 229.11, 229.21, 248/228.2
See application file for complete search history.

(56) References Cited

U.S. PATENT DOCUMENTS

| 205,481 | A | * | 7/1878 | Gurley | 248/188.5 |
|---|---|---|---|---|---|
| 4,523,735 | A | * | 6/1985 | Beck et al. | 248/476 |
| 4,767,090 | A | * | 8/1988 | Hartman et al. | 248/168 |
| 4,798,359 | A | * | 1/1989 | Ball | 248/188.3 |
| 5,253,833 | A | * | 10/1993 | Indou | 248/168 |
| 5,320,316 | A | * | 6/1994 | Baker | 248/163.1 |
| 5,503,357 | A | * | 4/1996 | Johnson et al. | 248/188.5 |
| 5,887,835 | A | * | 3/1999 | Hein et al. | 248/163.1 |
| 6,254,043 | B1 | * | 7/2001 | Schwarzler | 248/163.1 |
| 6,322,027 | B1 | * | 11/2001 | Hsu | 248/177.1 |
| 6,467,738 | B1 | * | 10/2002 | Hedrick et al. | 248/164 |
| 6,631,877 | B1 | * | 10/2003 | Crain et al. | 248/168 |

FOREIGN PATENT DOCUMENTS

| DE | 8812402 | 11/1988 |
|---|---|---|
| DE | 3821085 | 12/1989 |
| GB | 2 246 600 | 2/1992 |
| GB | 2 262 306 | 6/1993 |
| GB | 2 275 449 | 8/1994 |

OTHER PUBLICATIONS

PCT International Search Report, International Application No. PCT/GB01/04008, dated Jun. 5, 2002.
GB Search Report, Application No. GB 0021888.3, dated Dec. 21, 2001.

* cited by examiner

*Primary Examiner*—Korie Chan
*Assistant Examiner*—Steven Marsh
(74) *Attorney, Agent, or Firm*—Patterson & Sheridan, L.L.P.

(57) ABSTRACT

The disclosure relates to a clamp (18) for an elongate member (16) comprising a housing (25) through which an elongate member may extend, a clamping member (33) to engage the elongate member and a locking mechanism for pressing the clamping member against the elongate member. The locking mechanism has a rotatable input (37, 41) about a defined axis and a rotary cam means (35, 39) for converting rotation of the input into linear movement of the clamping member in said axis to effect and release engagement of the clamping member with the elongate member.

9 Claims, 4 Drawing Sheets

CLAMPS FOR ELONGATE MEMBERS

This invention relates to a clamp for an elongate member and is particularly, although not exclusively applicable to clamps for locking adjustable telescopic legs of a tripod stand for a camera.

Our UK patent publication no. 2246600 discloses a tripod stand having adjustable telescopic legs locked by clamps and discloses the need for readjustment of the clamps due to wear and tear. The clamps comprise a first member movable relative to a housing to effect clamping between them, torque limiting drive means rotatable to effect that movement, and lost motion stop means rotatable by the drive means into a first stop position relative to the housing (in which continued rotation of the drive means is permitted) and, through reverse rotation of the drive means, into a second stop position spaced angularly from the first, in which continued reverse rotation of the drive means is prevented thus preventing accidental complete unwinding.

Our UK patent specification no. 2262306 also discloses a clamp for an extendable multi-part telescopic leg of a tripod stand for a camera. The clamp comprises a base for mounting on the one part of the leg and having a pair of resilient C-shaped clamping jaws mounted on the base with their axes spaced apart and extending parallel to one another to receive the circular cross-section members forming another part of the leg. A clamping member is mounted on the base to act on the jaws to close the C-shapes around the members to grip and lock the jaws to the members.

The object of the present invention is to provide a simpler and more precisely operable clamping mechanism for locking the telescopic legs of a camera tripod in a required position of adjustment.

This invention provides a clamp for an elongate member comprising a housing through which an elongate member may extend, a clamping member to engage the elongate member and operating means for pressing the clamping means against the elongate member, the operating means having a rotatable input about a defined axis and a rotary cam means for converting rotation of the input into linear movement of the clamping member in said axis to effect and release engagement of the clamping member with the elongate member.

More specifically the rotary cam means may comprise a face cam and a cam follower, one of which is rotate with respect to the other by said rotary input to cause linear displacement of the clamping member.

By way of example the face cam and cam follower may act between the rotary input and the housing to displace the rotary input with rotation of the input and the input is coupled to the clamping member to move the clamping member linearly into and out of engagement with the elongate member extending through the housing.

Further the rotary input may comprise a shaft mounted in the housing having a handle at one end located on one side of the housing for manual rotation of the shaft, a face cam mounted on said one side of the housing around the entry of the shaft into the . housing, a cam follower formed on the side of the handle adjacent the housing for engagement with the face cam and means connecting the shaft to the clamping member to be moved into and out of the clamping engagement with an elongate member extending through the housing with rotation of the handle/shaft and interaction between the cam follower and cam.

In a further arrangement the rotary input may comprise a shaft mounted in the housing having a handle at one end for rotation of the shaft, the shaft having a cam follower mounted thereon and the clamping member having a face cam thereon for engagement with the cam follower on the shaft to be displaced by rotation of the shaft into locking engagement with an elongate member extending through the housing.

The following is a description of some specific embodiments of the invention, reference being made to the accompanying drawings in which.

Figure 1:
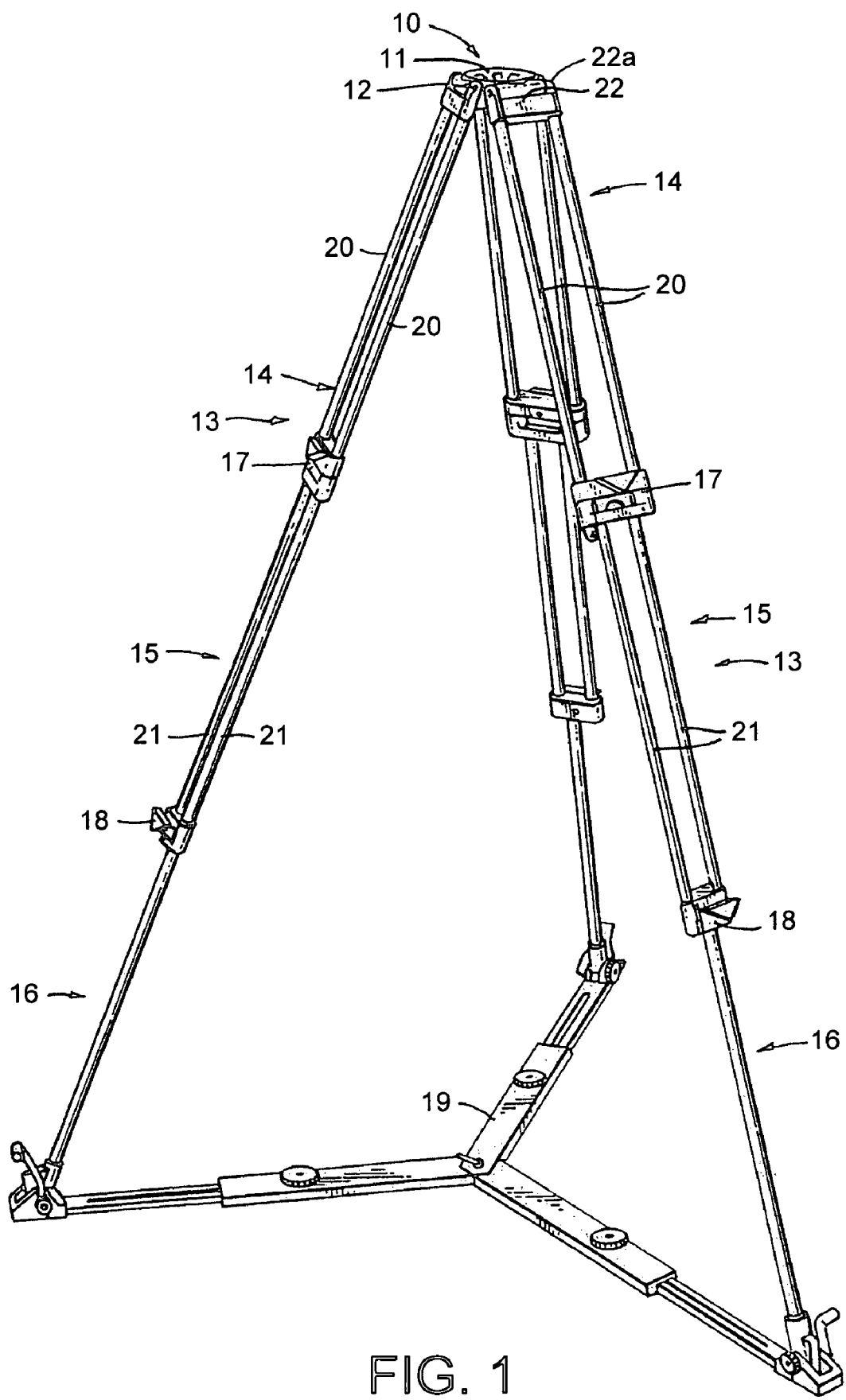
FIG. 1 is a perspective view of a tripod mounting for a film or video camera having three-part telescopically extendible legs with upper and lower locking clamps for locking respective leg parts in a desired position of extension.

FIG. 1 of the drawings shows a camera tripod of generally conventional form comprising a mounting 10 having a levelling bowl 11 to receive a mounting of a pan/tilt camera which is secured in the bowl in a conventional manner. The levelling bowl has three hinge mountings 12 in which pivot pins are supported at three equi-spaced locations around the mounting and three telescopically extendible legs indicated generally at 13 are pivotally mounted at their upper ends to the respective pivot pins.

Each extendible leg 13 comprises an upper leg part indicated generally at 14, an intermediate leg part indicated generally at 15 and a lower leg part indicated generally at 16 which are telescopically interconnected by upper and lower connector clamps 17 and 18 respectively. The lower ends of the legs are interconnected by a three arm adjustable spreader indicated at 19 to control the spread of the legs.

The upper leg part 14 of each telescopically extendible leg comprises a widely spaced pair of parallel tubes 20 the upper ends of which are connected by a rigid member 22 formed with projecting hinge elements 22a which are mounted on the projecting ends of one of the aforesaid hinge pins located on the mounting. The upper of the connector clamps 17 is slidably mounted on the tubes 20 and is clampable in any required position by a clamping mechanism which will be described below. The intermediate leg part 15 comprises a pair of relatively narrowly spaced parallel tubes 21 inset to slide between the tubes 20 and mounted at their upper ends in the upper connector clamp 17. The lower ends of the tubes 21 are mounted in the lower connector clamp 18.

The lower leg part 16 is of oval cross-section and is slidably mounted in the lower connector clamp 18 to slide between the tubes 21. The connector clamp has a mechanism for locking the tube 20 in any required position of extension with respect to the intermediate leg part 15.

The lower connector clamp will now be described in greater detail with reference to FIG. 2 to 4. The lower connector clamp 18 comprises a moulded body 25 having a front wall 26 rear wall 27 top wall 28 and bottom wall 29. A pair of laterally spaced sockets 30 extend downwardly into the mounted body from the top wall 28 in which the lower ends of the tubes 21 of the intermediate leg part 15 are received and bonded. Between the sockets 30, the moulded body is formed with a throughway 31 extending from the top wall to the bottom wall of generally oval cross section to receive the lower leg part 16.

Figure 2:
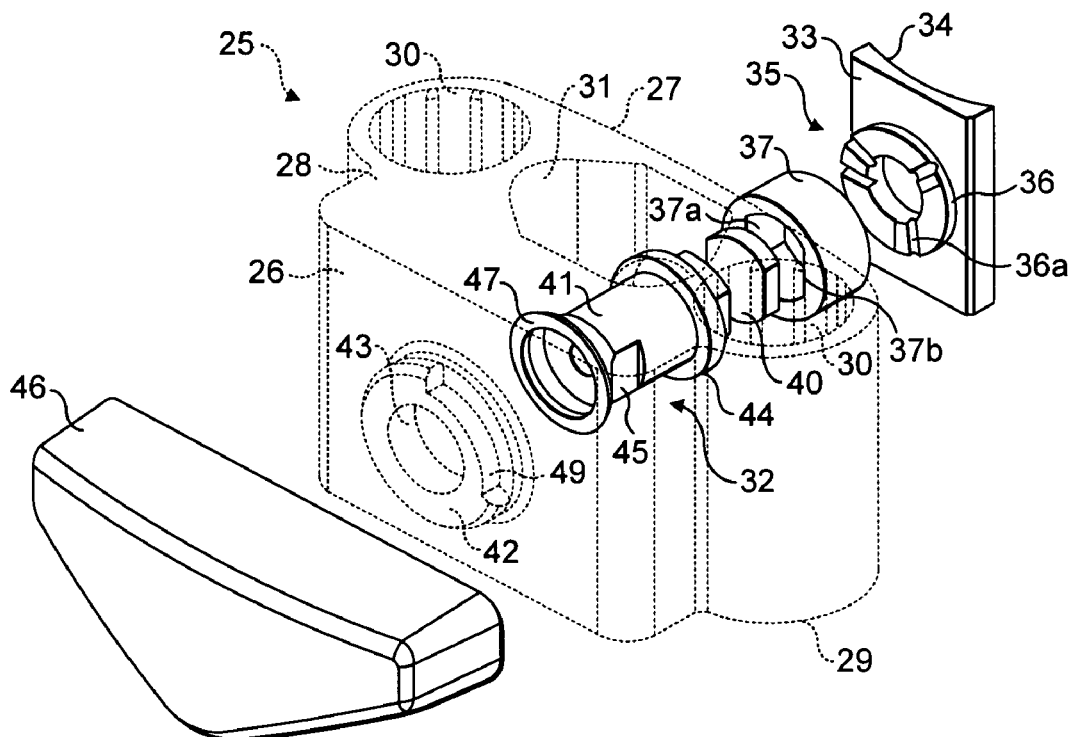
FIG. 2 is a three-quarter front perspective view of one of the lower locking clamps.
Figure 3:
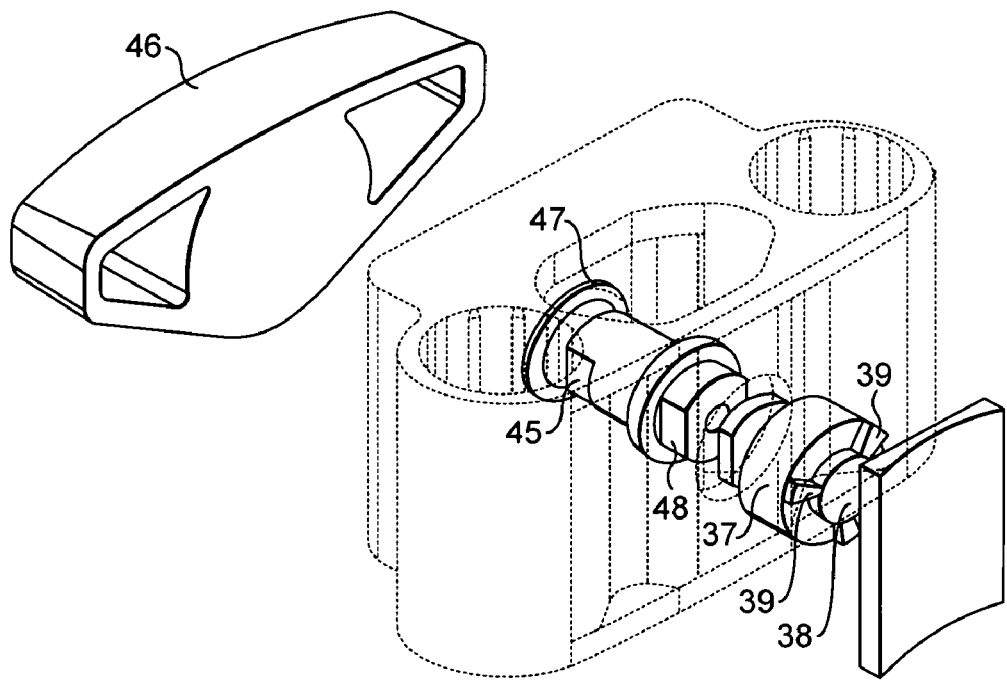
FIG. 3 is a three-quarter rear perspective view of the lower locking clamp.
Figure 4:
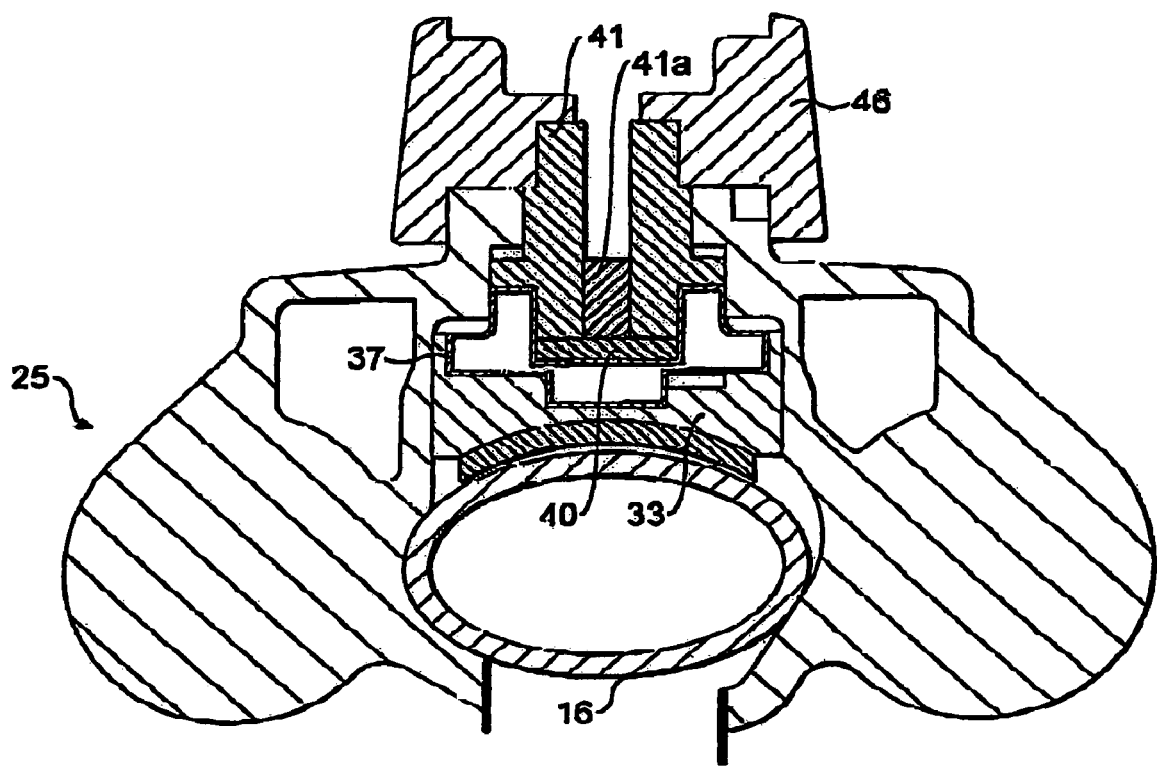
FIG. 4 is a view of the lower locking clamp.

The lower leg part 16 can be locked in any desired position from extension in the clamp 18 by a locking mechanism which is indicated generally at 32 in FIGS. 2 and 3 and which is shown in those Figures in exploded form outside the clamp body for the sake of clarity. The mechanism is in fact mounted within the clamp body behind the front wall of the body as can be seen in a cross sectional view of FIG. 4. The locking mechanism comprises a rectangular brake pad 33 having a shallow concave friction face 34 on one side which bears against the oval tube 16 within the clamping body. On the other side of the brake pad 33 there is formed an annular cam member 35 having a face cam formed by three identical shallow ramps 36 spaced around the annular cam. A hollow hub 37 is located next to the annular cam and has a raised central boss 38 on one end which engages in the central recess of the annular cam 35. The boss has three narrow cam followers 39 which extend radially outwardly from the central hub 38 of the boss to engage the ramps 36 of the face cam.

The boss 38 and cam 39 are formed on one end of the hub 37. The other end of the hub is formed with a circular cross section socket 37a having a flats 37b on either side thereof. A washer 40 of similar cross section is slidably located in the socket. The hub 37 is rotated with respect to the face cam by a spindle 41 mounted in an integral housing 42 formed on the front wall 26 of the connector body 25. The housing 42 has through bore 43 in which the spindle is supported for rotation. The spindle has an integral annular shoulder 44 which engages behind the mounting to hold the spindle in place in the housing. The end of the spindle projecting from the housing is formed with flats 45 on either side thereof and is locked in a corresponding cross-section bore (not shown) In a moulded handle 46 for rotating the spindle manually. A washer 47 is provided on the spindle between the handle 46 and housing 42. The other end of the spindle within the connector body is also formed with flats 48 to engage in and provide a driving connection with the hub 37 to rotate the hub with respect to the face cam and thereby to press the friction face 34 of the pad 33 into engagement with the tube 16 to lock the tube in the connector body.

As indicated earlier, there are three arcuate face cams formed by ramps 36 of equal length on the pad 33 which are engaged by three cam followers 39 formed on the hub 37. To constrain the rotation of the cam followers 39 to their respective ramps 36, the handle 46 is limited in rotation by means of a projection (not shown) on the inside face of the handle which engages in an arcuate recess 49 formed around the periphery of the mounting 42. This limits rotation of the handle to approximately one-quarter of a full turn which advances the cam followers 39 around the ramps 36 to displace the plate 33 forward into clamping engagement with the tube 16. Each of the ramps 36 forming the face cam has a shallow depression 36a adjacent the top of the ramp 36 in which the cam followers 39 engage to resist rotation of the handle/spindle from the full locking position. In other words, as the hub 37 rotates, the cam followers 39 slide up the ramps 36 thereby urging the plate 33 from a first position to a second position, whereby in the second position, the cam followers 39 engage the depressions 36a to maintain the clamp member in the second position.

A long grub screw 41a (see FIG. 4) is provided through the spindle 41 with a head of the grub screw accessable from the outer end of the spindle for adjustment and the other end of the screw projecting from the end 41 of the spindle and bearing on the washer 40 in the hub 37. By screwing the grub screw to increase the extent to which the screw projects from the spindle, the plate 33 is adjusted so that the defined locking rotation of the handle/spindle of one quarter turn fully locks the tube 16 in the connector body. Also free play can be removed from the mechanism so that rotation of the spindle instantly drives the plate 33 forwardly against the tube 16 to clamp the tube in the clamp body 25.

Figure 5:
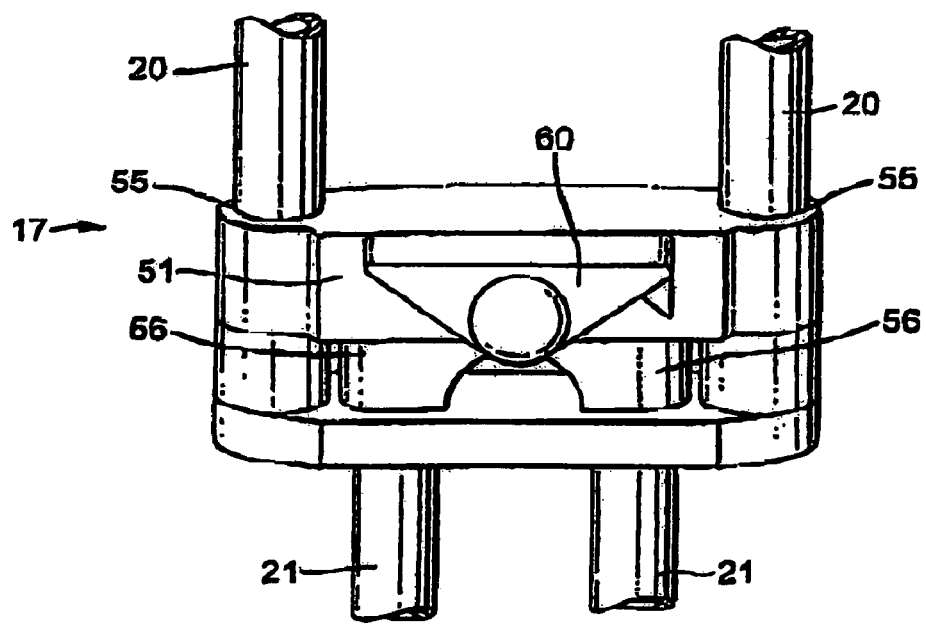
FIG. 5 is a front view of an upper locking clamp.
Figure 6:
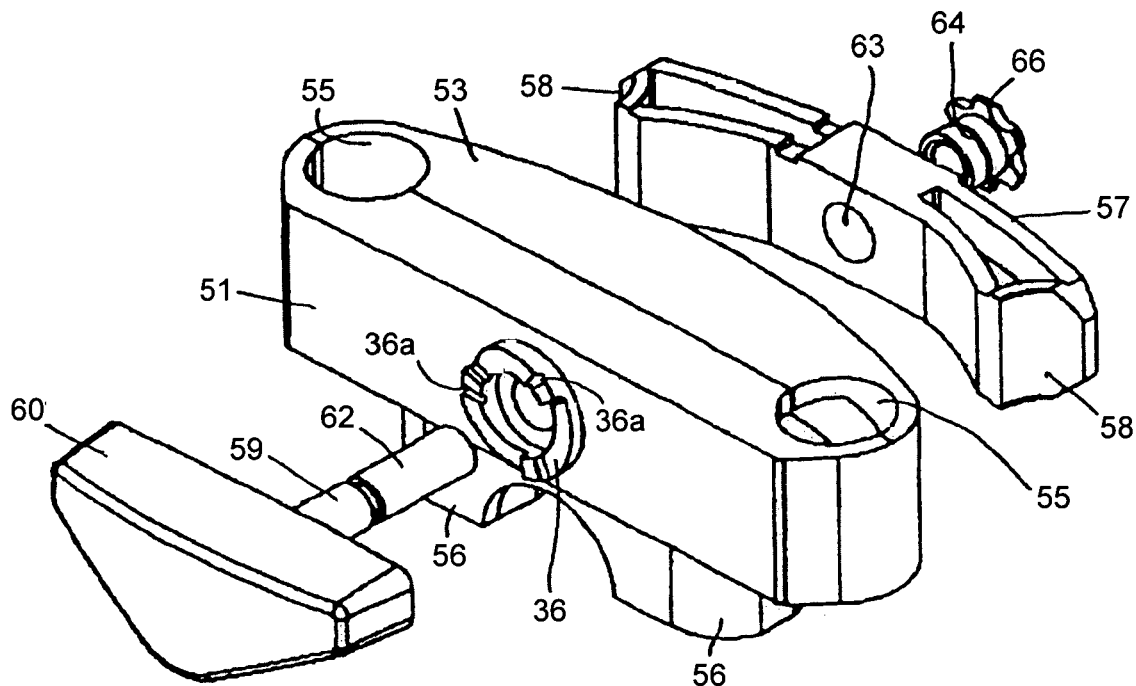
FIG. 6 is a three-quarter front perspective view of the upper clamp.
Figure 7:
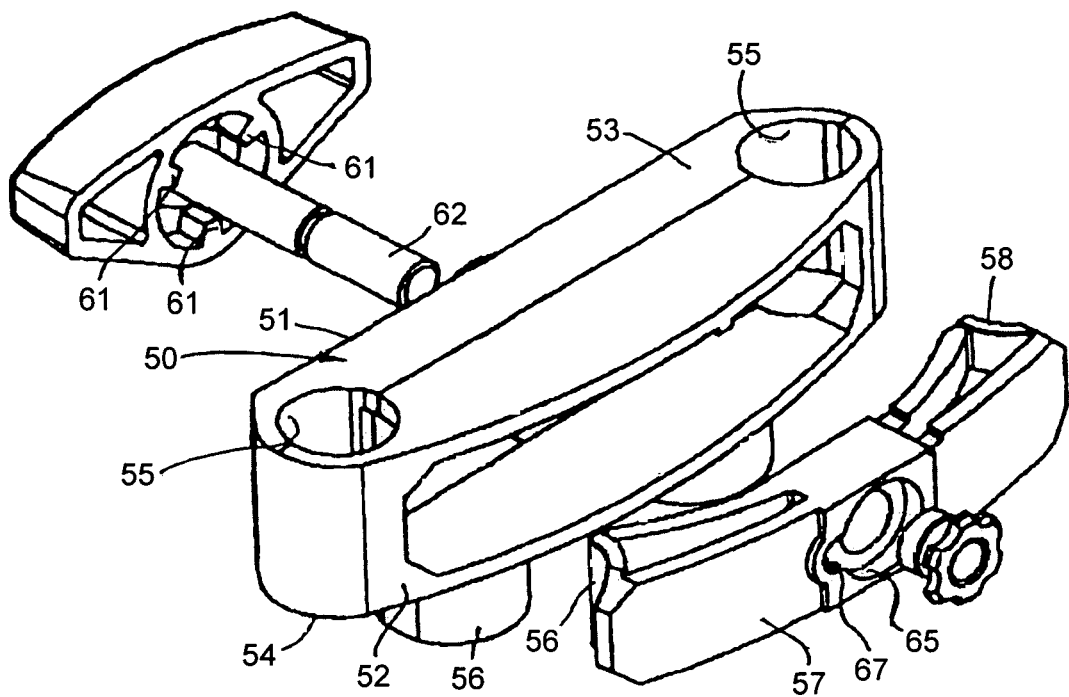
FIG. 7 is a three-quarter rear perspective view of the upper clamp.

Reference is now made to FIGS. 5 to 7 which illustrate the upper clamp 17 of the leg. In this case the clamp has a moulded clamp body 50 having a front wall 51, back wall 52, top wall 53 and bottom wall 54. Two throughways 55 are formed adjacent the ends of the clamp body extending between the upper and lower walls in which the tubes 20 of the upper leg part 14 are slidable. The bottom wall 54 of the body has two downwardly facing sockets 56 in which the upper ends of the tubes 21 of the intermediate leg part are bonded. The rear wall 52 and walls of the sockets 55 within the clamp body are cut away to receive a shoe member 57 having arcuate end walls 58 to bear against the tubes where they extend through the sockets.

The front wall 51 of the clamp body has an annular face cam 36 formed with three arcuate ramps similar to the face cam 36 on plate 33 of the lower clamp. The cams have shallow depressions 36a adjacent the top ends of the ramps to resist rotation of the handle/spindle from the fully locked position as in the first embodiment described. A spindle 59 extends through and is rotatably mounted in the front wall of the clamp body, the spindle having a handle 60 at the front of the clamp body which has three cam followers 61 moulded in spaced locations around the spindle on the inner side of the handle to engage the ramps of the face cam 58. The end of the spindle projecting through the clamp body is screw threaded at 62 and extends through a bore 63 in the shoe member 57 to engage in a screw threaded sleeve 64 housed In a socket 65 in the outer side of the shoe member to clamp the shoe member in the clamp body with the faces 58 in engagement with the tubes 18 extending through the clamp body. The screw threaded sleeve 64 has a notched rim 66 and the socket 65 in the shoe member has a recess 67 at one location in its periphery in which a grub screw is secured with the head of the screw in engagement with one of the notches in the rim 66 to lock the sleeve against rotation in the shoe member. The grub screw may be withdrawn to release the notched rim for rotation to allow the screw threaded sleeve 64 to be tightened onto the spindle 62 to remove any free play In the mechanism and to bring the faces 58 of the shoe member into close proximity with the tubes 18 where they pass through the clamp body. The grub screw is then secured in place in the recess 67 to lock the notch sleeve in position. Rotation of the handle 60 through up to a quarter turn will then suffice to draw the shoe member further into the clamp body forcing the clamp faces 58 into engagement with the tubes 18 to lock the clamp body on the tubes. Rotation of the handle 60 in the opposite direction releases the clamp engagement. A stop arrangement Is provided with the clamp body to limit rotation of the spindle to abut a ¼ turn as in the lower clamp previously described.

The invention claimed is:

1. A clamp for an elongate member, comprising:
a housing through which an elongate member may extend;
a clamping member to engage the elongate member; and
an operating means for pressing the clamping member against the elongate member, the operating means having an input rotatable about a defined axis and a cam means for converting rotation of the input between retracted and advanced positions into linear movement of the clamping member in said axis to effect and release engagement respectively of the clamping member with the elongate member, wherein means are provided for pre-adjusting the operating means for the clamping member such that in said advanced position, the clamping member is fully locked with the elongate member and wherein the cam means includes detent means engageable in the advanced position of the cam means to resist rotation of the cam means beyond the advanced position.

2. The clamp as claimed in claim 1, wherein the cam means comprise a face cam and a cam follower, one of which is rotated with respect to the other by said input to cause linear displacement of the clamping member.

3. The clamp as claimed in claim 2, wherein the face cam and cam follower act between the input and the housing to displace the input axially with rotation and the input is coupled to the clamping member to move the clamping member linearly into and out of engagement with the elongate member extending through the housing.

4. The clamp as claimed in claim 3, wherein the input comprises a shaft mounted in the housing having a handle at one end located on one side of the housing for manual rotation of the shaft, and wherein the face cam is mounted on said one side of the housing around the entry of the shaft into the housing, and the cam follower is formed on the side of the handle adjacent the housing for engagement with the face cam and means for connecting the shaft to the clamping member to be moved into and out of the clamping engagement with an elongate member extending through the housing with rotation of the handle/shaft and interaction between the cam follower and the face cam.

5. The clamp as claimed in claim 1, wherein the input comprises a shaft mounted in the housing having a handle at one end for rotation of the shaft, the shaft having a cam follower mounted thereon and the clamping member having a face cam thereon for engagement with the cam follower on the shaft to be displaced by rotation of the shaft into locking engagement with an elongate member extending through the housing.

6. The clamp as claimed in claim 1, wherein detent means is provided for resisting rotation of the rotary cam means from the "fully locked" position.

7. The clamp as claimed in claim 1, wherein means are provided for preadjusting the operating means for the clamping member such that in the "fully locked" position, the clamping member locks the elongate member in the housing.

8. An extendible telescopic leg having a clamp or clamps as claimed in claim 1.

9. A camera mounting tripod having extendible legs as claimed in claim 8.

* * * * *